United States Patent [19]

Ryu

[11] Patent Number: 5,023,722

[45] Date of Patent: Jun. 11, 1991

[54] CIRCUIT FOR GENERATING A CENTER POINT OF A VIEW FINDER

[75] Inventor: Seong-Bae Ryu, Kyungki, Rep. of Korea

[73] Assignee: SamSung Electronics Co. Ltd., Kyungki, Rep. of Korea

[21] Appl. No.: 363,712

[22] Filed: Jun. 9, 1989

[30] Foreign Application Priority Data

Jun. 11, 1988 [KR] Rep. of Korea ............... 88-9015[U]

[51] Int. Cl.⁵ ........................................ H04N 5/30
[52] U.S. Cl. .................................................. 358/224
[58] Field of Search ..................... 358/224, 225, 227

[56] References Cited

U.S. PATENT DOCUMENTS 4,599,653  7/1986  Kimura et al. ................ 358/224
4,837,633  6/1989  Parra ............................. 358/224

Primary Examiner—Stephen Brinich
Attorney, Agent, or Firm—Robert E. Bushnell

[57] ABSTRACT

This invention provides a circuit for generating a center point of a view finder comprising; a horizontal display-signal generation part 10 for generating the horizontal display-signal by adjusting the time constant of the monostable multivibrator IC1-IC4, a vertical display-signal generation part 20 for generating the vertical display-signal using 8-bit counter IC5 in which the horizontal drive-pulse is reset by the vertical drive-pulse, a center point display-signal composition part 30 for generating the center point display-signal by composition of the output of the horizontal and vertical display-signal generation parts 10 and 20, and a video signal composition part 40 for composition of the output of the center point display-signal composition part and the video signal and providing the composed output signal. Adjusting more accurately the center point of the image by a circuit rather than by a mechanism and removing the recording error may be attained, moreover, by controlling the linearity and having an utility in use may be attained according to the circuit of the present invention.

25 Claims, 3 Drawing Sheets

CIRCUIT FOR GENERATING A CENTER POINT OF A VIEW FINDER

BACKGROUND OF THE INVENTION

This invention relates to a circuit for generating a center point for adjusting the center of an image in a supervising monitor and a view finder (EVF).

A view finder supervises the image of a camera, and if the center of the image is not fit, the correct image is not recorded. Thus, in the past, a glass plate in which the center point is displayed is used in the front of a cathode-ray tube(CRT) for aligning the center of an image, but the center point is aligned by a mechanism so that it is different from the real center point.

To solve such a problem in the past, the center point is displayed by the following method; the horizontal line output with 24H is generated in the horizontal line counter 1 as shown in FIG. 1, and the output is applied to the clock port CK of a decimal counter 3 and the input port of a NAND gate N1 and is counted by the decimal counter 3, and the output of the decimal counter 3 through the NAND gate N1 is decomposed with the vertical line at the NAND gate N2 after generating the vertical line by sending the clock signal generated at the clock generation part 2 to the clock port CK of the decimal counter 4. But, in such circuits, the additional counter is needed, and the vertical and horizontal decimal counter is also needed so that the circuit is complicated due to many components and the manufacturing cost is increased.

SUMMARY OF THE INVENTION

The present invention has been made in consideration of this and has for its object to provide a circuit for generating a center point of the view finder, which can align accurately the center point of the view finder with that of the image.

Also, another object of the present invention is to provide a circuit for generating a center point of the view finder which can align the accurate center point of the image at the center point of the view finder by displaying a cross pattern when the decomposed video signal is aligned at the center of a view finder.

These objects can be achieved according to the steps of; the horizontal driving pulse being applied to the generation parts of the horizontal and vertical display-signal, then the generation parts sending out the horizontal and vertical display-line, and composing the display-line at the composition part of the center point display-signal, and the composed center point display-signal output with a cross type being composed with the video signal together.

According to the present invention, there is provided a circuit for generating a center point of a view finder comprising; a horizontal display-signal generation part for generating the horizontal display signal by adjusting the time constant of pulse-delay device, a vertical display-signal generation part for generating the vertical display-signal using a counter in which the horizontal drive-pulse is reset by the vertical drive-pulse, a center point display-signal composition part for generating the center point display-signal by composition of the output of the horizontal and vertical display-signal generation parts, and a video signal composition part for composing the output of the center point display-signal composition part and the video signal and sending the composed output signal.

DETAILED DESCRIPTION OF THE INVENTION

Figure 2:
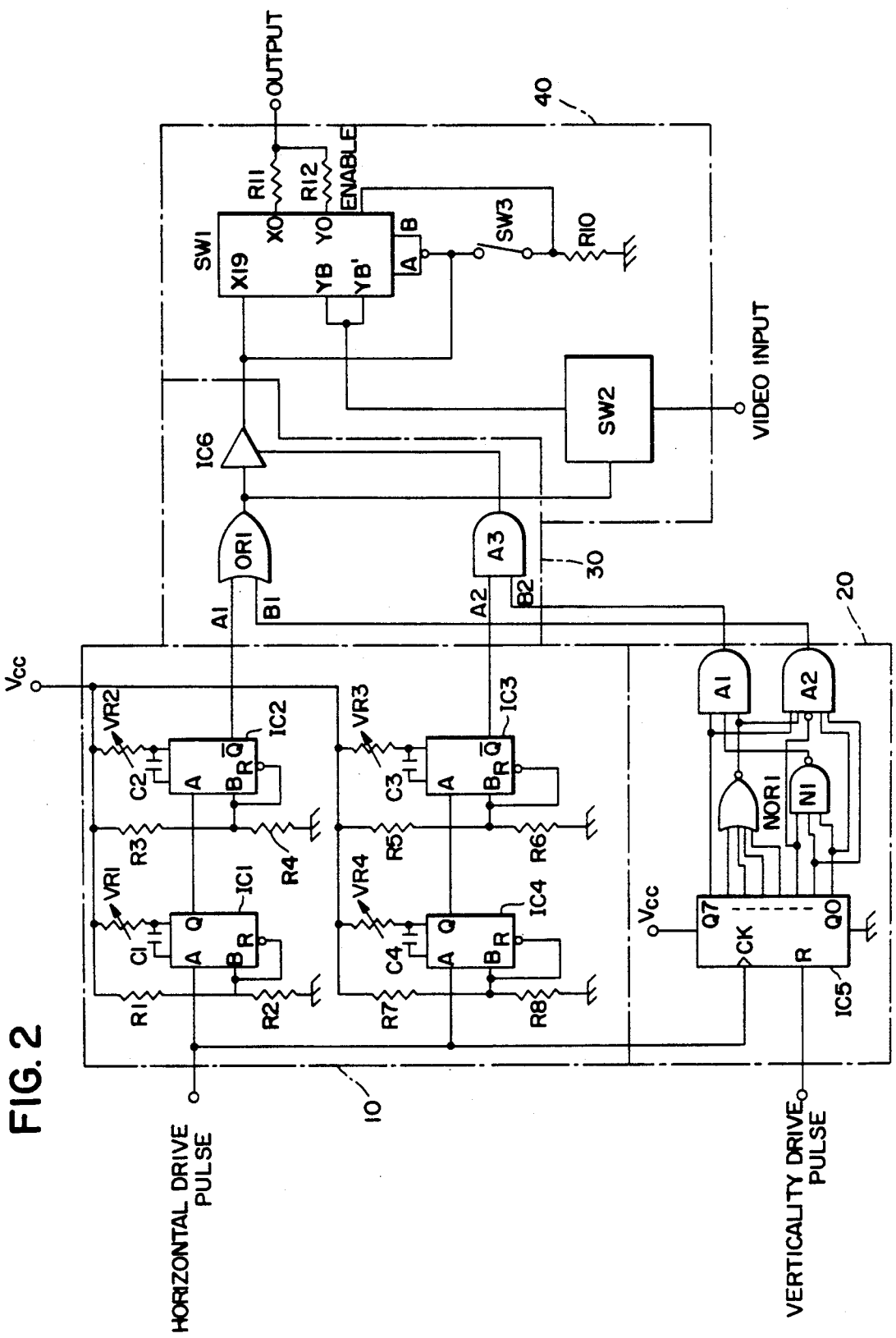
FIG. 2 is a circuit diagram of the present invention.
Figure 1:
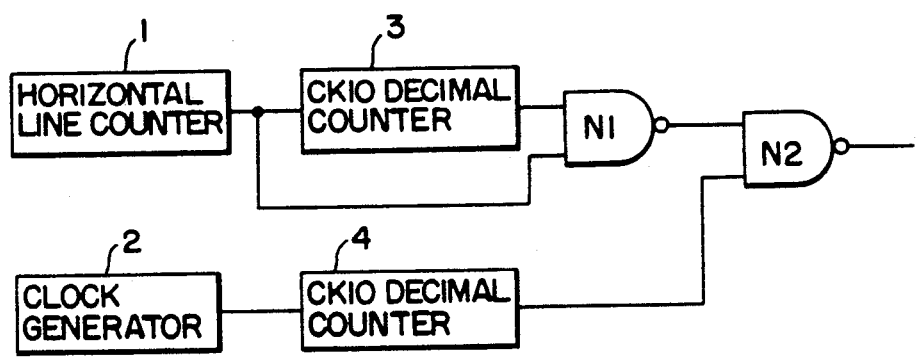
FIG. 1 is a conventional circuit diagram.

An embodiment of the present invention will now be described in more detail with reference to the accompanying drawings.

The present invention consists of the following major parts: the horizontal display-signal generation part 10 which consists of monostable multivibrator IC1-IC4 and generates the horizontal center point display-signal by the horizontal drive-pulse, the vertical display-signal generation part 20 for generating the vertical center point display-signal using 8-bit counter IC5 in which the horizontal drive-pulse is reset by the vertical drive-pulse, the center point display-signal composition part 30 for sending out the center point display-signal after combining the outputs of the horizontal and vertical display-signal generation parts 10 and 20, and the video signal composition part 40 for composing the center point display signal of the center point display-signal composition part 30 with the video signal and sending out the composed signal.

In the horizontal display-signal generation part 10, that is, the horizontal drive-pulse is applied to the one part of the OR gate OR1 through the monostable multivibrators IC1 and IC2 with the variable resistors VR1, VR2 and capacitors C1, C2 for time-constant, respectively, the horizontal drive-pulse is applied to one port and AND gate A3 through the monostable multivibrators IC3, IC4 with the variable resistors VR3, VR4 and capacitors C3, C4 for time-constant, respectively, and the divided voltage of the supply voltage VCC by the resistors R1-R8 is applied to the input port B and reset port R of each monostable multivibrator IC1-IC4.

And, the vertical display-signal generation part 20 consists, in which the counted output is applied to the other ports of the AND gate A3 and OR gate OR1 through the NOR gate NOR1 and NAND gate N1 and AND gates A1, A2 after counting the horizontal drive-pulse by the 8-bit counter IC5 while the vertical drive-pulse is applied.

At this time, each gate of the vertical display-signal generation part 20 sends out HIGH-level signals to the output port of the AND gate A2 only when the horizontal line is 131st, and sends out HIGH-level signals to the output port of AND gate A1 when the horizontal line is from 128th to 134th.

Also, the center point display-signal composition part 30 composes the outputs of the horizontal and vertical display-signal generation part 10, 20 through OR gate OR1 and AND gate A3, and sends out the center point display-signal with a cross type through tri-state buffer IC6.

And, the video signal composition part 40 in which the center point display-signal of the center point display-signal composition part is composed with the video signal applied through analog switch SW2 and is sent out to an analog switch SW1.

At this time, one can append or arbitrarily remove the center point display using the center point select-switch SW3 connected to the analog switch SW1. In this case, switch(SW1) is the device of MC 14051B and counter(IC5) is the device of MC 14020B of the MO-TOROLA company using only 8-bits of a 14-bit counter.

Figure 3A:
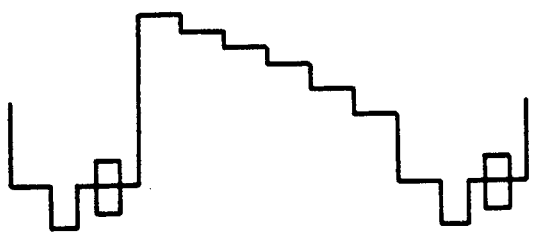
FIG. 3 is a waveform diagram of each parts of the present invention.

In the horizontal display-signal generation part 10 of the present invention with such structure, the divided voltage of the supply voltage VCC by resistor R1-R8 is applied to the input port B and the reset port of each monostable multivibrator IC1-IC4 so that the two ports are set at the HIGH-level and the video signal shown in FIG. 3(A) is applied to the circuit of the present invention.

Figure 3B:
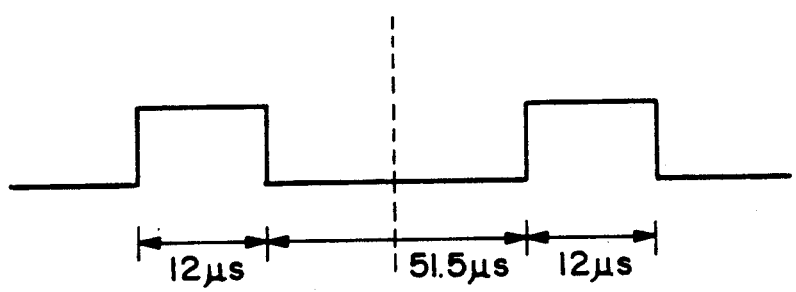
Figure 3C:
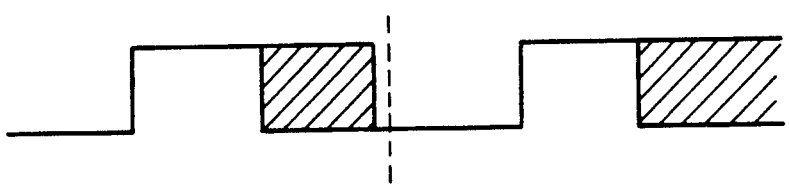
Figure 3D:
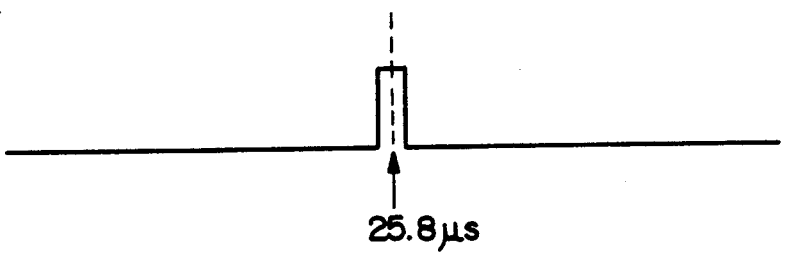

If the horizontal drive pulse with the width shown in FIG. 3(B) is applied to the input port A of the monostable multivibrator IC1, the output of the monostable multivibrator, which has the set width as shown in FIG. 3(C) by adjusting a time constant of the variable resistor VR1 and the capacitor C1, is provided and the output signal is applied to the input port A of the monostable multivibrator IC2 and is adjusted by a the variable resistor VR2 and the capacitor C2 so that the output port $\overline{Q}$ of the monostable multivibrator provides the output signal shown in FIG. 3(D) to port of the OR gate OR1.

Figure 4A:
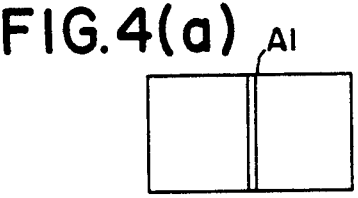
FIG. 4 is a state diagram being displayed on the screen, according to the present invention.

That is, the signal which is applied to a port of the OR gate OR1 shown in FIG. 3(D) is applied with a HIGH-level signal during the constant interval expanded to the left and right side at the center of the horizontal scanning period, that is, from 1H to 525H, so that it is displayed as shown in FIG. 4(a).

Figure 3E:
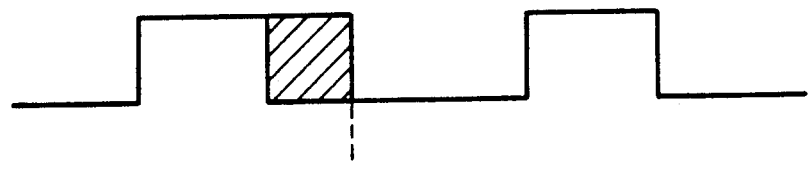

The horizontal drive-pulse shown in FIG. 3(B) is applied to the input port A of the monostable multivibrator IC4, and the pulse output shown in FIG. 3(E) is obtained by adjusting the time constant of the variable resistor VR4 and the capacitor. The pulse output of the monostable multivibrator IC4 is applied to the input port A of the one-shot multivibrator IC3 and is also adjusted by the variable resistor VR3 and the capacitor C3 so that the output port $\overline{Q}$ provides the output shown in FIG. 3(F) to an input port of AND gate A3.

Figure 4B:
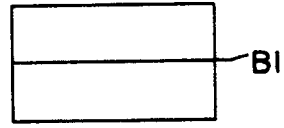
Figure 4C:
Figure 4D:
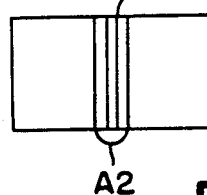
Figure 3F:
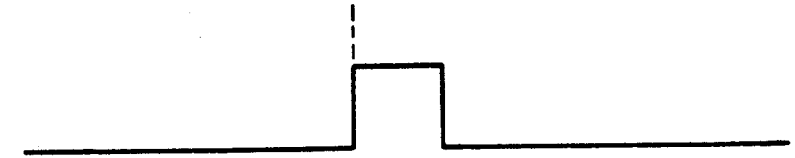

That is, the waveform shown in FIG. 3(F) which is applied to an input port of AND gate A3 is the same as the waveform shown in FIG. 3(D), but the width displayed on the screen is wider as shown in FIG. 4(d).

Finally, if the horizontal drive-pulse is applied to the horizontal display-signal generation part 10 which consists of the monostable multivibrator IC1-IC4 with the time constant being adjusted by the variable resistors VR1-VR4 and the capacitor C1-C4, the pulses shown in FIGS. 3(D)(E) are applied to the input ports of the OR gate OR1 and AND gate A3 so that the screen displays the input pulses as shown in FIGS. 4(a)(b) by these input pulses.

On the other hand, the horizontal drive-pulse is applied to the clock port CK of the 8-bit counter IC5, the 8-bit counter IC5 counts the number of horizontal drive-pulses during one period of the vertical drive-pulse applied to the reset port R, and the output of the 8-bit counter is applied to the AND gates A1, A2 through the NOR gate NOR1 and NAND gate N1.

By composition of the NOR gate NOR1, the NAND gate N1 and the AND gates A1, A2 which are connected to the output port of the 8-bit counter IC5, the output port of AND gate A2 provides a HIGH-level signal on the 131th horizontal line of 525 horizontal lines, and the output port of AND gate A1 provides HIGH-level signal on the lines between 128th line and 134th line, and each output is applied to the input ports of the OR gate OR1 and AND gate A3 respectively.

That is, when the horizontal line is the 131th line, the output of the 8-bit counter becomes a binary number "10000011", and it is applied to the AND gate A2 through the NOR gate NOR1 and the NAND Gate N1 so that the output port of the AND gate A2 provides HIGH-level only on the 131th line.

At this time, the screen displays as shown in FIG. 4(b) the output of the AND gate A2, the output of the AND gate A2 is applied to the OR gate OR1.

On the 128-134th horizontal lines, the output of the 8-bit counter IC5 has a binary number between "10000000" and "10000110" and is applied to the AND gate A1 through the NOR gate NOR1 gate NOR1 and the NAND gate N1 so that the output of the AND Gate A1 provides HIGH-level signals only on the 123-134th horizontal lines.

Figure 4E:
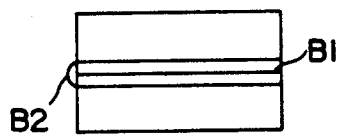
Figure 4F:
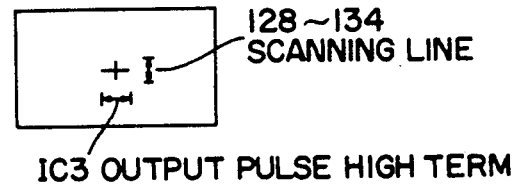

At this time, the screen displays as shown in FIG. 4(e) the output of the AND gate A1, the output of the AND gate A1 is applied to the AND gate A3.

The output of the OR gate OR1, in which the outputs of the monostable multivibrator IC2 and the AND gate A2 are applied as inputs, is applied to the tri-state buffer IC6 and the analog switch SW2 at the same time so that it can control the video input signal, and the output of the AND gate A3, in which the outputs of the monostable multivibrator IC3 and the AND gate A1 are applied as input to the control port of the tri-state buffer IC6 so that the output of the OR gate OR1 can be applied to the analog switch SW1 through the tri-state buffer IC6 only when the output of the AND gate A3 is HIGH-level.

That is, the output of a cross type of the OR gate OR1, shown in FIG. 4(c), is applied to the analog switch SW1 through the tri-state buffer IC6 only when the output of the AND gate A3 is a HIGH-level signal. The output of the OR gate OR1 also controls the analog switch SW2 and cuts off the video input signal when the output of a cross type is applied so that the video signal provided through the resistors R11, R12 at the analog switch SW1 is provided as the composed video signal with the center point display of a cross type.

At this time, the center point display turns ON/OFF according to the ON/OFF state of the analog switch SW3 connected to the analog switch SW1 so that the center point display can be appended or removed.

As mentioned above, the horizontal drive pulse is applied to the horizontal and vertical display-signal generation parts, and the horizontal and vertical display-line signal is provided, and the composed center point display output is composed with the video signal at the video signal composition part after composition of the center point composition part so that the view finder can monitor the image with the center point set by a circuit, according to the present invention. Therefore, the present invention can more accurately adjust the center point of the image by use of a circuit than a mechanism so that the recording error, such as the scattering of the image and balance, can be removed, it is easy to control the linearity and has an utility in use since the center point of a cross type can be removed.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modification or embodiments as fall within the true scope of the invention.

What is claimed is:

1. A circuit for generating a center point of a view finder, comprising:

first means including a plurality of pulse delay stages for generating first and second horizontal display-signals, upon receipt of a horizontal drive-pulse, by adjusting the time constants of said pulse-delay stages;

second means for generating first and second vertical display-signals using counter means to reset the horizontal drive-pulse upon application of a vertical drive-pulse;

third means for generating a center point display-signal by combining the output of said first and second means; and means for combining said center point display-signal with a video signal to provide a resulting output signal.

2. A circuit as claimed in claim 1, wherein said third means further comprises:

an OR gate generating a first signal from the combination of said first horizontal display-signal and said first vertical display signal;

an AND gate generating a second signal by combining said second horizontal display-signal and said second vertical display signal; and a buffer for providing said first signal from said OR gate to said combining means under the control of said second signal generated by said AND gate.

3. A circuit as claimed in claim 2, wherein each of said pulse delay stages comprise a monostable multivibrator, each having a corresponding resistor-capacitor time constant circuit.

4. A circuit as claimed in claim 3, wherein said second means further comprises a counter for receiving horizontal and vertical drive pulses and sending a high level signal to said AND gate of said third means when the horizontal drive pulse is counted 131 times, during application of the vertical drive pulse.

5. A circuit as claimed in claim 4, wherein said second means for generating sends a high level signal to said OR gate of said third generating means when the horizontal drive pulse is counted from 128 through 134 times by said counter during application of the vertical drive pulse.

6. A method for generating a center point of a view finder, comprising the steps of:

generating first and second horizontal display-signals from a horizontal drive pulse;

generating first and second vertical display-signals from the horizontal drive pulse and a received vertical drive pulse;

generating a center point display-signal by combining said first horizontal and first vertical display-signals and generating a control signal by combining said second horizontal and second vertical display-signals;

combining said center point display-signal with a video signal to produce a center point display.

7. A method as claimed in claim 6, further comprising the step of adjusting a time constant to change the periods of said first and second horizontal display-signals.

8. A method as claimed in claim 7, further comprising the step of resetting the horizontal drive-pulse, upon completion of each period of the vertical drive pulse, to generate said first vertical display-signal.

9. A method as claimed in claim 8, further comprising the step of logically combining said horizontal and vertical display-signals, upon counting the horizontal drive pulse 131 times during a period of the vertical drive pulse, to generate said center point display-signal.

10. A method as claimed in claim 9, further comprising the step of removing said center point display by switching said center point display-signal to a ground connection.

11. A circuit for generating a center point of a view finder, comprising:

first means for generating first and second horizontal display-signals from a received horizontal drive pulse;

second means for generating first and second vertical display-signals upon receipt of the horizontal drive pulse and a vertical drive pulse;

third means for generating a center point display-signal by combining the first horizontal and first vertical display-signals and a control signal by combining said second horizontal and second vertical display-signals; and fourth means for generating an output signal by combining, upon signalling of said control signal, said center point display-signal and a video signal.

12. A circuit as claimed in claim 11, wherein said first means for generating comprises:

a plurality of monostable multivibrators; and a plurality of resistor-capacitor time constant circuits, each attached to a respective monostable multivibrator to change the time constants of said horizontal display signals.

13. A circuit as claimed in claim 12, wherein said second means for generating comprises:

counter means to reset the horizontal drive-pulse;

first and second AND gates, said first gate being signaled by said counter when the horizontal drive pulse is counted through a middle range of a scan of said horizontal drive pulse during the vertical drive pulse and said second gate is signaled by said counter when the horizontal drive pulse is counted at a center line within said middle range during the vertical drive pulse;

A NOR gate signalled by said counter during counting of the horizontal drive pulse to signal said first AND gate; and a NAND gate signalled by said counter during counting of the horizontal drive pulse to signal said second AND gate.

14. A circuit as claimed in claim 13, wherein said third means for generating, comprises:

an OR gate signalled by said second AND gate on a count of 131 said counter during each period of the vertical drive pulse to produce a center point display signal;

a third AND gate signalled by said first AND gate on a count of 128 through 134 by said counter during each period of the vertical drive pulse; and a buffer to control application of the center point display signal from said OR gate, upon signalling by said third AND gate, to said third generating means.

15. A circuit as claimed in claim 14, wherein said fourth means for generating, comprises a plurality of analog switches to control the display of said composed output signal.

16. A circuit for generating a center point of a view finder, comprising:

first means for generating a horizontal display-signal from a received horizontal drive pulse, comprising:
   a plurality of monostable multivibrators; and
   a plurality of resistor-capacitor time constant circuits, each attached to a respective monostable multivibrator;

second means for generating a vertical display-signal upon receipt of the horizontal drive pulse and a vertical drive pulse, comprising:
   counter means to reset the horizontal drive-pulse;
   first and second AND gates, said first gate is signaled by said counter when said horizontal drive pulse is counted 128-134 times during the vertical drive pulse and said second gate is signaled by said counter when said horizontal drive pulse is counted 131 times during the vertical drive pulse;
   a NOR gate signalled by said counter during counting of said horizontal drive pulse to signal said first AND gate; and
   a NAND gate signalled by said counter during counting of said horizontal drive pulse to signal said second AND gate;

third means for generating a center point display-signal composed of said horizontal and vertical display-signals by combining the first horizontal and first vertical display-signals and a control signal by combining said second horizontal and second vertical display-signals, comprising:
   an OR gate signalled by said second AND gate on a count of 131 by said counter during each period of the vertical drive pulse;
   a third AND gate signalled by said first AND gate on a count of 128-134 by said counter during each period of the vertical drive pulse; and
   a buffer to control application of the signals from said OR gate, upon signalling by said third AND gate, to said means for combining; and fourth means for generating an output signal by combining, upon signalling of said control signal, said center point display-signal and a video signal, comprising a plurality of analog switches to control the display of said resulting output signal.

17. A circuit for generating a center point of a view finder, comprising:

first means including pulse delay stages for generating first and second horizontal display-signals by adjusting the time constant of said pulse-delay stages;

second means for generating first and second vertical display-signals using counter means to reset a horizontal drive-pulse by application of a vertical drive-pulse;

third means for generating a center point display-signal by combining the output of said first and second means for generating; and means for combining said center point display-signal with a video signal to provide a resulting video signal in the form of a cross the vertical leg of the cross having a length equal to the width of the period of said second vertical display-signal and the horizontal leg of the cross having a length equal to the width of the period of said second horizontal display-signal.

18. A circuit as claimed in claim 13, wherein said middle range occurs when the horizontal drive pulse is counted from 128 through 134 times during the vertical drive pulse, and said center line occurs when the horizontal drive pulse is counted 131 times during the vertical drive pulse.

19. A circuit as claimed in claim 17, wherein said second generating means comprises:
   counter means to reset the horizontal drive-pulse;
   first and second AND gates, said first gate being signaled by said counter when the horizontal drive pulse is counted through a middle range of a scan of said horizontal drive pulse during the vertical drive pulse and said second gate is signaled by said counter when the horizontal drive pulse is counted at a center line within said middle range during the vertical drive pulse;
   a NOR gate signalled by said counter during counting of the horizontal drive pulse to signal said first AND gate; and
   a NAND gate signalled by said counter during counting of the horizontal drive pulse to signal said second AND gate.

20. A circuit as claimed in claim 17, wherein said third generating means comprises:
   an OR gate signalled by said second AND gate on a count of 131 by said counter during each period of the vertical drive pulse to produce a center point display signal;
   a third AND gate signalled by said first AND gate on a count of 128 through 134 by said counter during each period of the vertical drive pulse; and
   a buffer to control application of the center point display signal from said OR gate, upon signalling by said third AND gate, to said third generating means.

21. A method for generating a center point of a view finder, comprising the steps of:
   generating first and second horizontal display signals from a horizontal drive pulse using means for delaying a pulse;
   generating first and second vertical display signals by counting the horizontal drive pulse within a constant period by n-bits according to resetting;
   generating a center point display signal by providing a combined signal only at an interval where the second horizontal display signal and the second vertical display signal are constant with each other after the first horizontal display signal land the first vertical display signal are combined; and
   displaying a cross mark on view display by combining the center point display signal with a video signal.

22. A method as claimed in claim 21, further comprising the step of adjusting a time constant to change the periods of said first and second horizontal display-signals.

23. A method as claimed in claim 22, further comprising the step of resetting the horizontal drive-pulse, upon completion of each period of the vertical drive pulse, to generate said first vertical display-signal.

24. A method as claimed in claim 23, further comprising the step of logically combining said horizontal and vertical display-signals, upon counting the horizontal drive pulse a set number of times during a period of the vertical drive pulse, to generate said center point display-signal.

25. A method as claimed in claim 24, further comprising the step of removing said center point display by switching said center point display-signal to a connection for a reference potential.

* * * * *

UNITED STATES PATENT AND TRADEMARK OFFICE
CERTIFICATE OF CORRECTION

PATENT NO. : 5,023,722
DATED : 11 June 1991
INVENTOR(S) : Seong-Bae RYU It is certified that error appears in the above-identified patent and that said Letters Patent is hereby corrected as shown below:

Claim 21, Column 8, Line 45, change "land" to --and--.

Signed and Sealed this

Twelfth Day of October, 1993

*Attest:*

BRUCE LEHMAN

*Attesting Officer*     *Commissioner of Patents and Trademarks*